US010042845B2

(12) United States Patent
Amin et al.

(10) Patent No.: US 10,042,845 B2
(45) Date of Patent: Aug. 7, 2018

(54) TRANSFER LEARNING FOR BILINGUAL CONTENT CLASSIFICATION

(71) Applicant: Microsoft Technology Licensing, LLC, Redmond, WA (US)

(72) Inventors: Mohammad Shafkat Amin, Cupertino, CA (US); Baoshi Yan, Belmont, CA (US); Craig Martell, San Juan Bautista, CA (US); Vita Markman, San Francisco, CA (US); Anmol Bhasin, Los Altos, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/928,331

(22) Filed: Oct. 30, 2015

(65) Prior Publication Data

US 2016/0124942 A1 May 5, 2016

Related U.S. Application Data

(60) Provisional application No. 62/073,556, filed on Oct. 31, 2014.

(51) Int. Cl.
*G06F 17/00* (2006.01)
*G06F 17/28* (2006.01)
(Continued)

(52) U.S. Cl.
CPC ............ *G06F 17/289* (2013.01); *G06F 17/27* (2013.01); *G06F 17/2854* (2013.01); *G06Q 50/01* (2013.01); *H04L 51/12* (2013.01)

(58) Field of Classification Search
CPC .... G06F 17/27; G06F 17/2854; G06F 17/289; G06Q 50/01; H04L 51/12
See application file for complete search history.

(56) References Cited

U.S. PATENT DOCUMENTS 4,930,077 A * 5/1990 Fan ..................... G06Q 30/02
379/92.03
6,081,779 A * 6/2000 Besling ............... G10L 15/065
704/240

(Continued)

FOREIGN PATENT DOCUMENTS

WO    WO-2016070034 A1    5/2016

OTHER PUBLICATIONS

Duan, L., et al., "Domain transfer SVM for video concept detection," CVPR, pp. 1375-1381 (2009).*

(Continued)

*Primary Examiner* — Fariba Sirjani
(74) *Attorney, Agent, or Firm* — Schwegman Lundberg & Woessner, P.A.

(57) ABSTRACT

This disclosure provides systems and methods for determining a classification model for a secondary language different from a primary language. A social networking server is configured to obtain primary language content written in a first spoken language and secondary language content written in a second spoken language. The social networking server further obtains a machine translation of the primary language content. The social networking server then determines an initial language model from the machine translation. The social networking further determines a language model perturbation using the initial language model, where the language model perturbation accounts for a difference between the machine translation and the secondary language content. The social networking server also determines a classification model from the initial language model and the language model perturbation, which is then applied to a plurality of comments associated with an item of interest provided by a social networking service.

20 Claims, 6 Drawing Sheets

(51) Int. Cl.
  *G10L 15/00*  (2013.01)
  *H04L 12/58*  (2006.01)
  *G06F 17/27*  (2006.01)
  *G06Q 50/00*  (2012.01)

(56) References Cited

U.S. PATENT DOCUMENTS

| | | | | | |
|---|---|---|---|---|---|
| 6,167,377 | A * | 12/2000 | Gillick | | G10L 15/063 |
| | | | | | 704/240 |
| 6,418,431 | B1 * | 7/2002 | Mahajan | | G06F 17/30687 |
| 6,691,088 | B1 * | 2/2004 | Blasig | | G10L 15/197 |
| | | | | | 704/240 |
| 6,961,699 | B1 * | 11/2005 | Kahn | | G10L 15/26 |
| | | | | | 704/235 |
| 7,143,035 | B2 * | 11/2006 | Dharanipragada ... | | G10L 15/197 |
| | | | | | 704/244 |
| 7,594,189 | B1 * | 9/2009 | Walker | | G06Q 30/02 |
| | | | | | 715/811 |
| 7,711,571 | B2 * | 5/2010 | Heiner | | H04W 4/02 |
| | | | | | 704/1 |
| 8,255,948 | B1 * | 8/2012 | Black | | H04N 21/234336 |
| | | | | | 709/219 |
| 8,577,670 | B2 * | 11/2013 | Wang | | G06F 17/2715 |
| | | | | | 704/255 |
| 8,676,580 | B2 * | 3/2014 | Deshmukh | | G10L 15/197 |
| | | | | | 704/231 |
| 8,731,924 | B2 * | 5/2014 | Tur | | G10L 15/065 |
| | | | | | 704/244 |
| 8,738,376 | B1 * | 5/2014 | Goel | | G10L 15/14 |
| | | | | | 704/205 |
| 8,831,943 | B2 * | 9/2014 | Emori | | G10L 15/197 |
| | | | | | 704/251 |
| 9,043,417 | B1 * | 5/2015 | Jones | | H04L 63/1416 |
| | | | | | 709/206 |
| 9,146,943 | B1 * | 9/2015 | Thakur | | G06F 17/30286 |
| 9,401,947 | B1 * | 7/2016 | Oztaskent | | H04L 67/02 |
| 9,471,565 | B2 * | 10/2016 | Barbosa | | G06F 17/2845 |
| 9,564,122 | B2 * | 2/2017 | Bretter | | G06F 17/2785 |
| 2004/0249637 | A1 * | 12/2004 | Baker | | G10L 15/1822 |
| | | | | | 704/239 |
| 2007/0033028 | A1 * | 2/2007 | Yao | | G10L 15/20 |
| | | | | | 704/233 |
| 2007/0239444 | A1 * | 10/2007 | Ma | | G10L 15/20 |
| | | | | | 704/233 |
| 2009/0198493 | A1 * | 8/2009 | Hakkani-Tur | | G10L 15/065 |
| | | | | | 704/235 |
| 2009/0282343 | A1 * | 11/2009 | Catlin | | G06F 17/30867 |
| | | | | | 715/738 |
| 2009/0292698 | A1 * | 11/2009 | Remy | | G06F 17/30616 |
| 2009/0319518 | A1 * | 12/2009 | Koudas | | G06F 17/30696 |
| 2009/0326913 | A1 * | 12/2009 | Simard | | G06F 17/2836 |
| | | | | | 704/2 |
| 2011/0282648 | A1 * | 11/2011 | Sarikaya | | G06F 17/2818 |
| | | | | | 704/7 |
| 2012/0158753 | A1 * | 6/2012 | He | | G06F 17/30867 |
| | | | | | 707/752 |
| 2012/0159635 | A1 * | 6/2012 | He | | G06Q 50/01 |
| | | | | | 726/26 |
| 2012/0166291 | A1 * | 6/2012 | Broder | | G06Q 30/0256 |
| | | | | | 705/14.71 |
| 2012/0254333 | A1 * | 10/2012 | Chandramouli | | G06F 17/27 |
| | | | | | 709/206 |
| 2013/0110498 | A1 * | 5/2013 | Bekkerman | | G06F 17/2745 |
| | | | | | 704/9 |
| 2013/0185055 | A1 * | 7/2013 | Theoret | | G06F 17/277 |
| | | | | | 704/9 |
| 2013/0191468 | A1 * | 7/2013 | Dichiu | | H04L 12/585 |
| | | | | | 709/206 |
| 2013/0204811 | A1 * | 8/2013 | Morinaga | | G06N 99/005 |
| | | | | | 706/12 |
| 2013/0339202 | A1 * | 12/2013 | Zhao | | G06Q 30/04 |
| | | | | | 705/34 |
| 2013/0339342 | A1 * | 12/2013 | Jain | | G06F 17/30867 |
| | | | | | 707/722 |
| 2014/0156669 | A1 * | 6/2014 | Bati | | G06F 17/30336 |
| | | | | | 707/741 |
| 2014/0280614 | A1 * | 9/2014 | Alakuijala | | H04L 51/063 |
| | | | | | 709/206 |
| 2014/0303960 | A1 * | 10/2014 | Orsini | | G06F 17/2854 |
| | | | | | 704/2 |
| 2014/0358930 | A1 * | 12/2014 | Lerman | | G06F 17/30707 |
| | | | | | 707/740 |
| 2015/0186938 | A1 * | 7/2015 | Zhang | | G06Q 30/0256 |
| | | | | | 705/14.54 |
| 2015/0295870 | A1 * | 10/2015 | Jiang | | H04L 51/12 |
| | | | | | 709/206 |
| 2015/0363388 | A1 * | 12/2015 | Herdagdelen | | G06F 17/28 |
| | | | | | 704/2 |
| 2015/0365447 | A1 * | 12/2015 | Klein | | H04L 65/403 |
| | | | | | 709/204 |
| 2016/0026919 | A1 * | 1/2016 | Kaisser | | G06Q 10/06 |
| | | | | | 706/12 |
| 2016/0055235 | A1 * | 2/2016 | Zhang | | G06F 17/30684 |
| | | | | | 707/749 |
| 2016/0055250 | A1 * | 2/2016 | Rush | | G06Q 50/01 |
| | | | | | 707/733 |
| 2016/0055490 | A1 * | 2/2016 | Keren | | G06Q 30/00 |
| | | | | | 705/14.47 |
| 2016/0057092 | A1 * | 2/2016 | Liao | | G06F 17/30864 |
| | | | | | 709/206 |
| 2016/0078359 | A1 * | 3/2016 | Csurka | | G06N 7/005 |
| | | | | | 706/12 |
| 2016/0085869 | A1 * | 3/2016 | Magdy | | G06F 17/30867 |
| | | | | | 707/740 |
| 2016/0124942 | A1 * | 5/2016 | Amin | | G06F 17/27 |
| | | | | | 704/2 |
| 2016/0188633 | A1 * | 6/2016 | Wang | | G06F 17/30867 |
| | | | | | 707/728 |

OTHER PUBLICATIONS

"International Application Serial No. PCT/US2015/058300, International Search Report dated Jan. 19, 2016", 4 pgs.
"International Application Serial No. PCT/US2015/058300, Written Opinion dated Jan. 19, 2016", 6 pgs.
Amini, Massih-Reza, et al., "A co-classification approach to learning from multilingual corpora", Machine learning, 79(1-2), (2010), 105-121.
Banea, Carmen, "Multilingual subjectivity: are more languages better?", In Proceedings of the 23rd International Conference on Computational Linguistics, (2010), 28-36.
Do, Chuong B., et al., "Transfer learning for text classification", NIPS, (2005), 8 pgs.
Duan, Lixin, "Domain transfer svm for video concept detection.", Computer Vision and Pattern Recognition, 2009. CVPR 2009. IEEE Conference, (Jun. 2009), 1375-1381.
Foster, George, et al., "Discriminative instance weighting for domain adaptation in statistical machine translation", Proceedings of the 2010 Conference on Empirical Methods in Natural Language Processing, Association for Computational Linguistics, (2010), 451-459.
Hoffman, Judy, et al., "Efficient learning of domain-invariant image representations", International Conference on Learning Representations, (2013), 1-9.
Huang, Jiayuan, et al., "Correcting sample selection bias by unlabeled data", Advances in neural information processing systems, (2006), 8 pgs.
Jiang, Jing, "Domain adaptation in natural language processing", (2008), 130 pgs.
Kibriya, Ashraf M., et al., "Multinomial naive bayes for text categorization revisited.", AI 2004: Advances in Artificial Intelligence,Springer., (2005), 12 pgs.
Kurokawa, David, et al., "Automatic detection of translated text and its impact on machine translation", Proceedings. MT Summit XII, The Twelfth Machine Translation Summit International Association

(56) References Cited

OTHER PUBLICATIONS for Machine Translation Hosted by the Association for Machine Translation in the Americas, (2009), 8 pgs.

Laubli, Samuel, et al., "Combining statistical machine translation and translation memories with domain adaptation.", (2013), 11 pgs.

Ling, Xiao, "Can Chinese web pages be classified with English data source?", In Proceedings of the 17th International conference on World Wide Web, ACM, (2008), 969-978.

Pan, J., "Cross-lingual sentiment classification via bi-view non-negative matrix tri-factorization", In Advances in Knowledge Discovery and Data Mining, Springer, (2011), 289-300.

Pedregosa, Fabian, et al., "Machine learning in Python", Journal of Machine Learning Research, (2011), 2825-2830.

Slocum, Jonathan, "A survey of machine translation: its history, current status, and future prospects", Computational Linguistics, 11(1), (1985), 1-17.

Sun, Qian, et al., "A two-stage weighting framework for multi-source domain adaptation", In Advances in neural information processing systems, (2011), 1-9.

Tang, Jiliang, et al., "Enriching short text representation in microblog for clustering.", Frontiers of Computer Science, 6(1), (2012), 1-13.

Tibshirani, Robert, "Regression shrinkage and selection via the lasso", Journal of the Royal Statistical Society.Series B (Methodological), pages , 1996., (1996), 267-288.

Vinokourov, Alexei, et al., "Inferring a semantic representation of text via cross-language correlation analysis", In Advances in neural information processing systems, pages, (2002), 8 pgs.

Wang, Jie, et al., "Lasso screening rules via dual polytope projection.", In Advances in Neural Information Processing Systems, (2013), 1-9.

Wang, Pu, "Transfer learning using encyclopedic knowledge", Data Mining Workshops, 2009. ICDMW '09. IEEE International Conference, (Dec. 2009), 435-440.

Xiang, Shuo, "Simultaneous feature and feature group selection through hard thresholding", In Proceedings of the 20th ACM SIGKDD international conference on Knowledge discovery and data mining, ACM, (2014), 532-541.

Yang, Jun, et al., "Cross-domain video concept detection using adaptive svms.", In Proceedings of the 15th international conference on Multimedia, ACM, (2007), 188-197.

"International Application Serial No. PCT/US2015/058300, International Preliminary Report on Patentability dated May 11, 2017", 8 pgs.

\* cited by examiner

TRANSFER LEARNING FOR BILINGUAL CONTENT CLASSIFICATION

CROSS-REFERENCE TO RELATED APPLICATIONS

This application claims the benefit of priority to U.S. Pat. App. No. 62/073,556, titled "TRANSFER LEARNING FOR BILINGUAL CONTENT CLASSIFICATION" and filed Oct. 31, 2014, the disclosure of which is hereby incorporated by reference in its entirety.

TECHNICAL FIELD

The subject matter disclosed herein generally relates to classifying secondary language content as relevant or irrelevant, and, in particular, to applying a transfer learning process to train a language classifier for classifying the secondary language content using machine-translated primary language content and natively written secondary language content.

BACKGROUND

Popular online content providers attract millions of visitors per day. The content providers may provide one or more webpages having content readable by the various visitors. The one or more webpages may be configured to allow the visitors to provide feedback (e.g., comments) for the subject of the one or more webpages. For example, a webpage may be a news article and the online content provider may allow visitors to provide comments about the article.

However, to facilitate discussion among visitors, online content providers may not screen (e.g., moderate) comments left by the visitors. If comments are not screened, malicious visitors (e.g., spammers or other irresponsible visitors) may leave comments that are irrelevant to the topic of the given webpage. These comments may include offers to work from home, product promotions, event promotions, advertising, marketing materials, and other such comments. These types of comments are problematic because they detract from the open forum promoted by the online content provider and drive legitimate visitors (e.g., visitors that leave comments relating to the topic of the webpage) away. This, in turn, reduces the overall visitor traffic to the online content provider. As online content providers typically rely on visitor traffic to generate revenue, a decrease in legitimate visitors impacts the online content provider's ability to generate such revenue.

Furthermore, an online content provider may support receiving comments in one or more languages. However, the online content provider may not have access to sufficient information to identify potentially problematic comments (e.g., where the online content provider operates primarily in the English language but supports the ability to comment in another language, such as Spanish or German). Thus, identifying or moderating comments provided in a language other than the primary language of the online content provider may be difficult.

BRIEF DESCRIPTION OF THE DRAWINGS

Some embodiments are illustrated by way of example and not limitation in the figures of the accompanying drawings.

DETAILED DESCRIPTION

Figure 1:
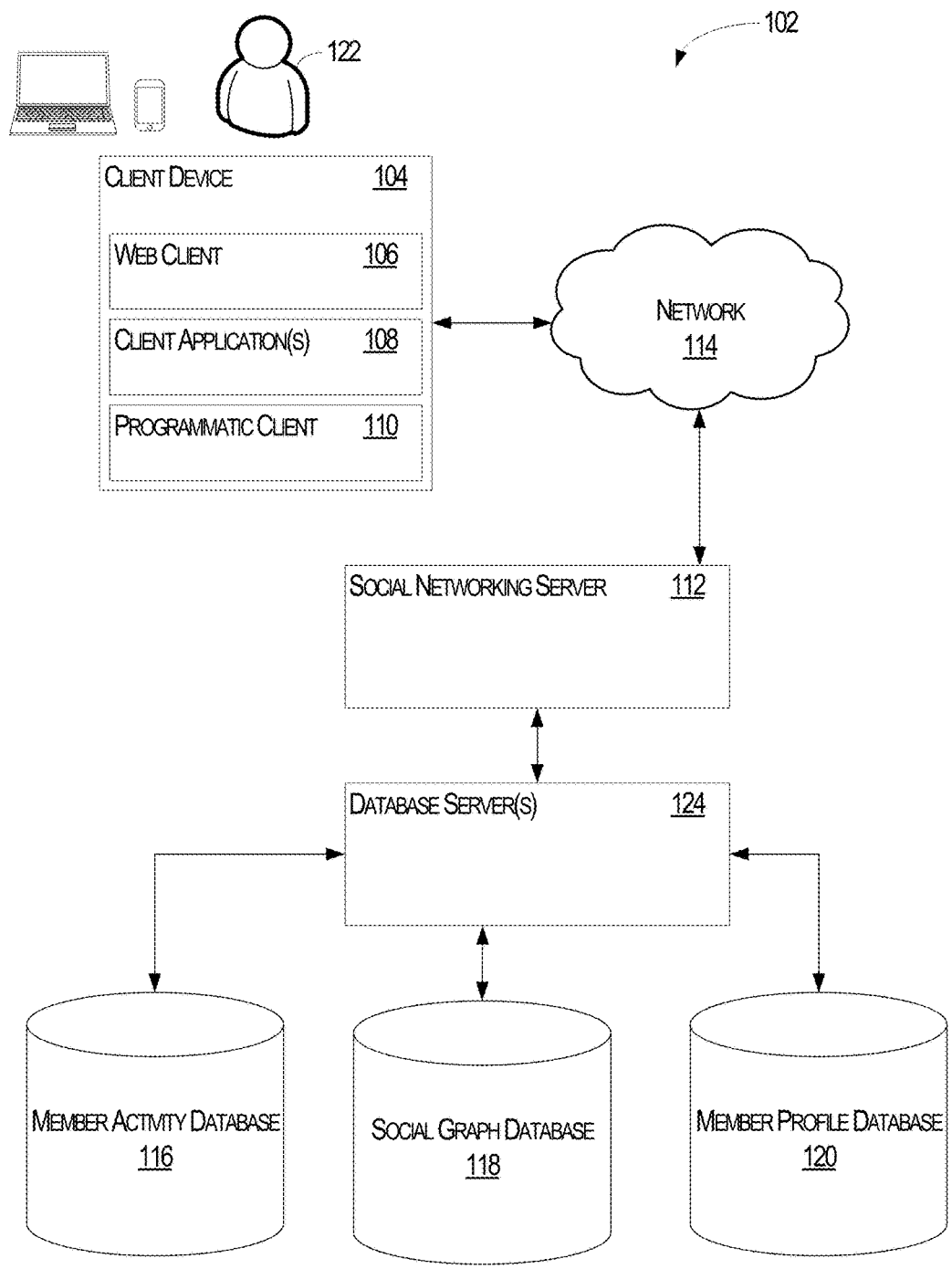
FIG. 1 is a block diagram illustrating a network architecture, including a social networking server, according to some example embodiments.

Example methods and systems are directed to classifying secondary language content as relevant or irrelevant, and, in particular, to applying a transfer learning process to train a language classifier for classifying the secondary language content using machine-translated primary language content and natively written secondary language content. The disclosed embodiments include a client-server architecture where a social networking server has access to a social graph of its social networking members. The social networking server includes various modules and engines that obtain human-written primary language content and human-written secondary language content from the content provided by the social networking members. The modules and engines of the social networking server further include language translators and feature identifiers to facilitate the translation of the human-written primary language content, and to identify features in the translated content in the human-written secondary language content.

Using the identified features, the social networking server then employs various modules to select the features from the corresponding machine-translated secondary language content and the human-written secondary language content. The social networking server further applies a re-weighing methodology to match the machine-translated secondary language content with the human-written secondary language content. A language model is then obtained from the re-weighed features, and the language model is adaptively updated where a predetermined amount of labeled information is available for the human-written secondary language content. The language model is then applied as a classifier to comments posted in the secondary language in an attempt to identify those comments which are relevant in the context in which they are posted.

Accordingly, this disclosure provides, in one embodiment, a system that includes a machine-readable memory storing computer-executable instructions and at least one hardware processor in communication with the machine-readable memory that, when the computer-executable instructions are executed, is configured to obtain primary language content written in a first spoken language, obtain secondary language content written in a second spoken language, and obtain a machine translation of the primary language content. The at least one hardware processor is further configured to determine an initial language model from the machine translation of the primary language content, determine a language model perturbation using the initial language model, the language model perturbation accounting for a difference between the machine translation of the primary language content and the secondary language content, and determine a classification model from the initial language model and the language model perturbation, the classification model identifying whether a given plurality of words are irrelevant.

In addition, the at least one hardware processor is further configured to apply the classification model to a plurality of comments associated with an item of interest provided by a social networking service, and prevent the display of at least one comment selected from the plurality of comments in response to classifying the at least one comment as irrelevant using the classification model.

In another embodiment of the disclosed system, the at least one hardware processor is further configured to determine a first plurality of features from the machine translation of the primary language content, and determine a second plurality of features from the secondary language content, wherein the determined initial language model is determined from the first plurality of features and the second plurality of features.

In a further embodiment of the disclosed system, at least some of the features of the first plurality of features are different from at least some of the features of the second plurality of features.

In yet another embodiment of the disclosed system, the at least one hardware processor is further configured to determine a plurality of weights for a selected set of the first plurality of features, the plurality of weights being determined according to Kernel Mean Matching (KMM) using a distribution of the second plurality of features.

In yet a further embodiment of the disclosed system, the language model perturbation is further determined using at least one feature selected from the second plurality of features.

In another embodiment of the disclosed system, the first spoken language is different from the second spoken language.

In a further embodiment of the disclosed system, the initial language model comprises a regularized logistic regression model.

This disclosure also provides for a method that includes obtaining, by at least one hardware processor, primary language content written in a first spoken language, obtaining, by the at least one hardware processor, secondary language content written in a second spoken language, and obtaining, by the at least one hardware processor, a machine translation of the primary language content. The method also includes determining, by the at least one hardware processor, an initial language model from the machine translation of the primary language content, determining, by the at least one hardware processor, a language model perturbation using the initial language model, the language model perturbation accounting for a difference between the machine translation of the primary language content and the secondary language content, and determining, by the at least one hardware processor, a classification model from the initial language model and the language model perturbation, the classification model identifying whether a given plurality of words are irrelevant.

In addition, the method includes applying, by the at least one hardware processor, the classification model to a plurality of comments associated with an item of interest provided by a social networking service, and preventing, by the at least one hardware processor, the display of at least one comment selected from the plurality of comments in response to classifying the at least one comment as irrelevant using the classification model.

In another embodiment of the disclosed method, the method includes determining a first plurality of features from the machine translation of the primary language content, and determining a second plurality of features from the secondary language content, wherein determining the initial language model comprises determining the initial language model from the first plurality of features and the second plurality of features.

In a further embodiment of the disclosed method, at least some of the features of the first plurality of features are different from at least some of the features of the second plurality of features.

In yet another embodiment of the disclosed method, the method includes determining a plurality of weights for a selected set of the first plurality of features, the plurality of weights being determined according to Kernel Mean Matching (KMM) using a distribution of the second plurality of features.

In yet a further embodiment of the disclosed method, the language model perturbation is further determined using at least one feature selected from the second plurality of features.

In another embodiment of the disclosed method, the first spoken language is different from the second spoken language.

In a further embodiment of the disclosed method, the initial language model comprises a regularized logistic regression model.

This disclosure further provides for a machine-readable medium storing computer-executable instructions that, when executed by at least one hardware processor, cause the at least one hardware processor to perform a plurality of operations, the plurality of operations comprising obtaining primary language content written in a first spoken language, obtaining secondary language content written in a second spoken language, and obtaining a machine translation of the primary language content. The plurality of operations also include determining an initial language model from the machine translation of the primary language content, determining a language model perturbation using the initial language model, the language model perturbation accounting for a difference between the machine translation of the primary language content and the secondary language content, and determining a classification model from the initial language model and the language model perturbation, the classification model identifying whether a given plurality of words are irrelevant.

Furthermore, the plurality of operations include applying the classification model to a plurality of comments associated with an item of interest provided by a social networking service, and preventing the display of at least one comment selected from the plurality of comments in response to classifying the at least one comment as irrelevant using the classification model.

In another embodiment of the disclosed machine-readable medium, the plurality of operations further comprise determining a first plurality of features from the machine translation of the primary language content and determining a second plurality of features from the secondary language content, and determining the initial language model comprises determining the initial language model from the first plurality of features and the second plurality of features.

In a further embodiment of the disclosed machine-readable medium, at least some of the features of the first plurality of features are different from at least some of the features of the second plurality of features.

In yet another embodiment of the disclosed machine-readable medium, the plurality of operations further comprise determining a plurality of weights for a selected set of the first plurality of features, the plurality of weights being determined according to Kernel Mean Matching (KMM) using a distribution of the second plurality of features.

In yet a further embodiment of the disclosed machine-readable medium, the language model perturbation is further determined using at least one feature selected from the second plurality of features.

In another embodiment of the disclosed machine-readable medium, the first spoken language is different from the second spoken language.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 102 is shown. A social networking server 112 provides server-side functionality via a network 114 (e.g., the Internet or a wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on the client device 104. The social networking server 112 is further communicatively coupled with one or more database servers 124 that provide access to one or more databases 116-120.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronics system, or any other communication device that a user 122 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 122 that is used to perform one or more searches for user profiles accessible to, or maintained by, the social networking server 112.

In one embodiment, the social networking server 112 is a network-based appliance that responds to initialization requests or access queries from the client device 104. One or more users 122 may be a person, a machine, or other means of interacting with the client device 104. In various embodiments, the user 122 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, social networking access client, and the like. In some embodiments, if the social networking access client is included in the client device 104, then this application is configured to locally provide the user interface and at least some of the functionalities of a social networking service, with the application configured to communicate with the social networking server 112, on an as needed basis, for data and/or processing capabilities not locally available (e.g., to access a member profile, to authenticate a user 122, to identify or locate other connected members, etc.). Conversely, if the social networking access client is not included in the client device 104, the client device 104 may use its web browser to access the initialization and/or search functionalities of the social networking server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the network architecture 102 via the network 114. In this instance, the social networking server 112, in response to receiving the input from the user 122, communicates information to the client device 104 via the network 114 to be presented to the user 122. In this way, the user 122 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with one or more database server(s) 124 and/or database(s) 116-120. In one embodiment, the social networking server 112 is communicatively coupled to a member activity database 116, a social graph database 118, and a member profile database 120. The databases 116-120 may be implemented as one or more types of databases including, but not limited to, a hierarchical database, a relational database, an object-oriented database, one or more flat files, or combinations thereof.

The member profile database 120 stores member profile information about members who have registered with the social networking server 112. Consistent with some embodiments, when a person initially registers to become a member of the social networking service provided by the social networking server 112, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. In some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service provided by the social networking server 112 may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating the two vertices representing the members. As an example, two members are said to be "second-degree" connections where the members share a connection in common, but are not directly connected to one another. In one embodiment, the social graph maintained by the social networking server 112 is stored in the social graph database 118.

Although the foregoing discussion refers to a "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof. As discussed below, in generating the various indices, the social networking server 112 may be configured to generate a single graph or multiple graphs.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

In one embodiment, the social networking server 112 communicates with the various databases 116-120 through one or more database server(s) 124. In this regard, the database server(s) 124 provide one or more interfaces and/or services for providing content to, modifying content stored in, retrieving content from, or otherwise interacting with the databases 116-120. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the social networking server 112 communicates with the databases 116-120 and includes a database client, engine, and/or module, for providing data to, modifying data stored within, and/or retrieving data from, the one or more databases 116-120.

One of ordinary skill in the art will recognize that the database server(s) 124 may include one or more different types of servers. For example, the database server(s) 124 may include a Microsoft® Exchange Server, a Microsoft® Sharepoint® Server, a Lightweight Directory Access Protocol ("LDAP") server, any other server configured to provide user profile information, or combinations thereof. Accordingly, and in one embodiment, the servers in communication with the social networking server 112 are configured to access the various databases 116-120 and retrieve or store corresponding information.

Figure 2:
FIG. 2 illustrates a graphical user interface displaying an irrelevant comment submitted by a user, in accordance with an example embodiment.

FIG. 2 illustrates a graphical user interface 202 displaying an irrelevant comment 206 submitted by a user, in accordance with an example embodiment. As shown in FIG. 2, the graphical user interface 202 displays content submitted by a first user. In the example shown in FIG. 2, the content includes the words, "Noticed a lot of folks looking at my profile so I updated it some. Thank you!" The content is written in a first language, namely, English. As the content has been provided by a social networking member, the content is considered "human-written." The content shown in FIG. 2 may be stored in one or more of the databases shown in FIG. 1, such as the member activity database 116. In addition to the content, various users have submitted comments 204. In general, the comments 204 are relevant to the social networking member's content. However, some of the comments 204, such as the comment 206, are irrelevant. In this case, the irrelevant comment 206 should be removed and not displayed to the social networking members who have posted the other comments 204. The comment 206 is irrelevant because it relates to a social networking member searching for an employment opportunity and not to the content provided by the initial user. The comment 206 is detectable as an irrelevant or "spam" comment because it is written in the language of the initial content.

However, there may be instances where comments provided by the social networking members are written in a language different from the language of the initial content. Accordingly, it would be beneficial to remove irrelevant comments written in these secondary languages. The below disclosure relates to training a classifier using translated primary language content and human-written secondary language content. As used in this disclosure, the phrase "primary language" generally means "native language" and "secondary language" means "foreign language." One example is where the primary language is English and the secondary language is Chinese. Another example is where the primary language is Spanish and the secondary language is German.

Figure 3:
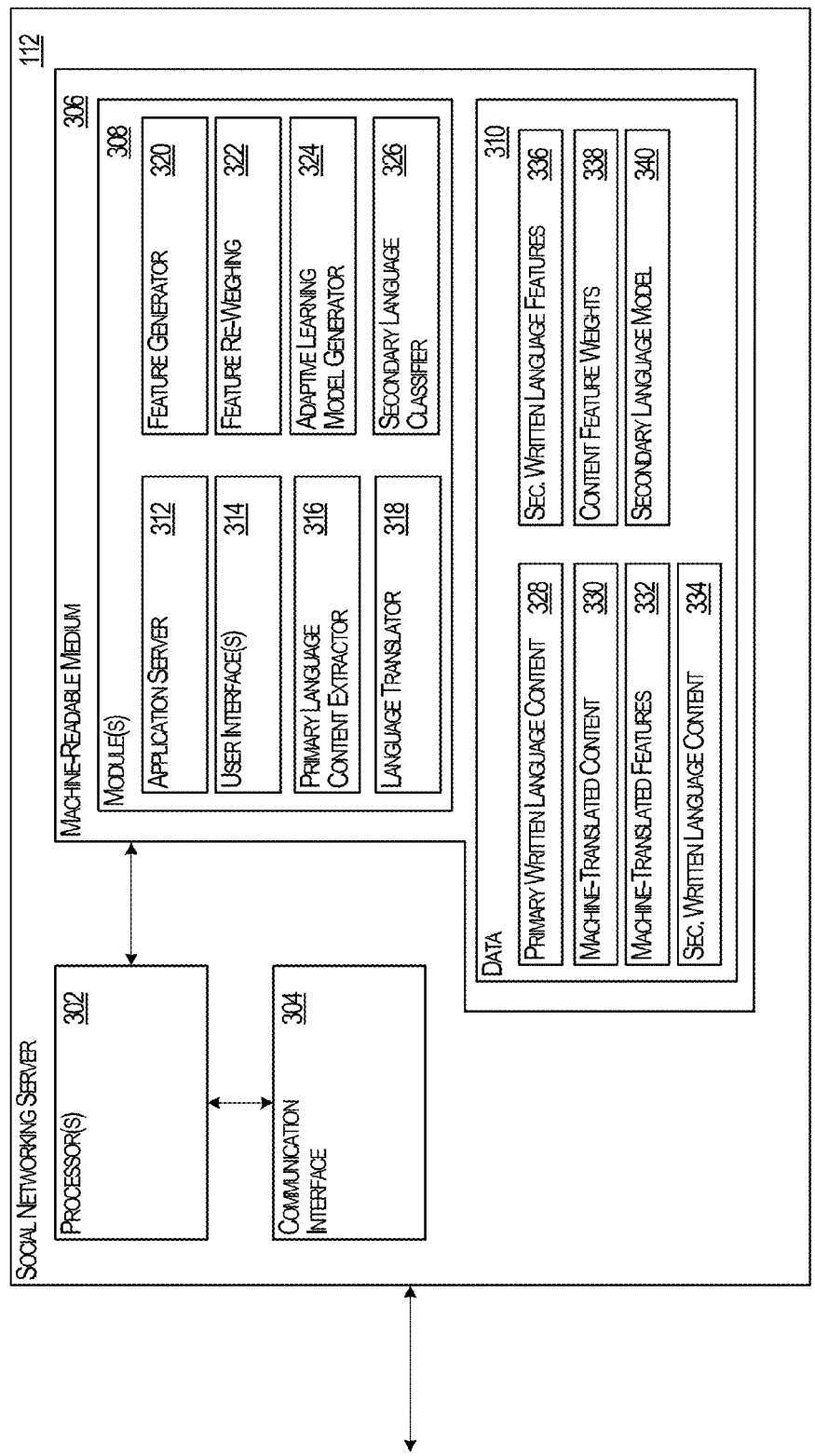
FIG. 3 illustrates a block diagram of the social networking server of FIG. 1, in accordance with an example embodiment.

FIG. 3 illustrates the social networking server 112 of FIG. 1 in accordance with an example embodiment. In one embodiment, the social networking server 112 includes one or more processor(s) 302, one or more communication interface(s) 304, and a machine-readable medium 306 that stores computer-executable instructions for one or more modules(s) 308 and data 310 used to support one or more functionalities of the modules 308.

The various functional components of the social networking server 112 may reside on a single device or may be distributed across several computers in various arrangements. The various components of the social networking server 112 may, furthermore, access one or more databases (e.g., the databases 116-120 or any of the data 310), and each of the various components of the social networking server 112 may be in communication with one or more other components. Further, while the components of FIG. 3 are discussed in the singular sense, it will be appreciated that in other embodiments multiple instances of the components may be employed.

The one or more processors 302 may be any type of commercially available processor, such as processors available from the Intel Corporation, Advanced Micro Devices, or Texas Instruments, or other such processors. Further still, the one or more processors 302 may include one or more special-purpose processors, such as a Field-Programmable Gate Array (FPGA) or an Application Specific Integrated Circuit (ASIC). The one or more processors 302 may also include programmable logic or circuitry that is temporarily configured by software to perform certain operations. Thus, once configured by such software, the one or more processors 302 become specific machines (or specific components of a machine) uniquely tailored to perform the configured functions and are no longer general-purpose processors.

The one or more communication interfaces 304 are configured to facilitate communications between the social networking server 112, the client device 104, and one or more of the database server(s) 124 and/or database(s) 116-120. The one or more communication interfaces 304 may include one or more wired interfaces (e.g., an Ethernet interface, a Universal Serial Bus (USB) interface, a Thunderbolt® interface, etc.), one or more wireless interfaces (e.g., an IEEE 802.11b/g/n interface, a Bluetooth® interface, an IEEE 802.16 interface, etc.), or a combination of such wired and wireless interfaces.

The machine-readable medium 306 includes various modules 308 and data 310 for implementing the social networking server 112. The machine-readable medium 306 includes one or more devices configured to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the modules 308 and the data 310. Accordingly, the machine-readable medium 306 may be implemented as a single storage apparatus or device, or, alternatively and/or additionally, as a "cloud-based" storage system or storage network that includes multiple storage apparatus or devices. As shown in FIG. 3, the machine-readable medium 306 excludes signals per se.

In one embodiment, the modules 308 are written in a computer programming and/or scripting language. Examples of such languages include, but are not limited to, C, C++, C#, Java, JavaScript, Perl, Python, or any other computer programming and/or scripting language now known or later developed.

With reference to FIG. 3, the modules 308 of the social networking server 112 include, but are not limited to, an application server module 312, a user interface module 314, a primary language content extractor 316, and a language translator module 318. The modules 308 further include a feature generator 320, a feature re-weighing module 322, an adaptive learning model generator 324, and a secondary language classifier module 326.

The social networking server 112 also includes data 310 to support the various modules 308. In one embodiment, the data 310 includes, but is not limited to, primary written language content (e.g., human-written content) 328, machine-translated content 330, and machine-translated features 332. The data 310 further includes secondary written language content (e.g., human-written content) 334, secondary written language features 336, content feature weights 338, and a secondary language model 340.

The application server module 312 provides the various social networking applications and functionalities of the social networking server 112. Such applications include, but are not limited to, a news application that provides items of interest or other newsworthy items, a commenting application that supports the publication and/or submission of member comments, a posting application that facilitates the publication of member-generated content, a connection application that establishes connections among various members, an employment application that supports posting available jobs and receiving member submissions, and other such applications or combinations of applications. The functionalities provided by the application server module 312 include, but are not limited to, posting textual content and/or audiovisual content, uploading and/or downloading audiovisual content, editing or modifying previously posted and/or uploaded content, editing a member profile, editing connections of a member profile, and other such functionalities or combinations thereof.

The user interface module 314 is configured to provide access to, and interactions with, the social networking server 112. In one embodiment, the user interface module 314 provides one or more graphical user interfaces, which may be provided using the Hypertext Transfer Protocol (HTTP). The graphical user interfaces are displayable by the client device 104 and accept input from the user 122 for interacting with the social networking server 112. Further still, the user interface module 314 may be configured to provide such interfaces to one or more clients displayable by the client device 104, such as the web client 106, one or more client applications 108, or the programmatic client 110. By interacting with the user interface module 314, the user 122 can upload content to the social networking server 112 or can submit comments on content previously uploaded by other members or provided by the social networking service.

The primary language content extractor 316 is configured to extract words or phrases written in a first or primary language (e.g., English, Chinese, or another native language). In one embodiment, the primary language is established by the social networking server 112 or an operator and/or administrator of the social networking service. The primary language content extractor 316 may obtain the primary language content from a variety of sources available via the social networking service. For example, the primary language content extractor 316 may obtain the primary language content from member-submitted postings, member-submitted comments, news articles, or other items of interest obtained by the social networking server 112, and other such sources. In one embodiment, the primary language content extractor 316 obtains primary language content from one or more of the databases 116-120, such as the member activity database 116. In this regard, the member activity database 116 may store member-submitted content in one or more database tables and/or fields of the member activity database 116. Thus, the primary language content extractor 316 obtains the primary language content by referencing the corresponding one or more database tables and/or fields of the member activity database 116. The primary language content extractor 316 stores the extracted content as the primary written language content 328.

In addition, the primary written language content 328 may be labeled, such as by crowdsourcing the primary written language content 328. As known in the art, crowdsourcing is a technique whereby a group of users are asked to perform individual tasks collectively. In this manner, many users perform one or two labeling tasks rather than a single user labeling thousands of instances in the primary written language content 328. In one embodiment, the social networking server 112 is configured with a predetermined threshold for obtaining instances of corresponding primary languages (e.g., 12,000 instances for English, 10,000 instances for Spanish, 15,000 instances for Chinese, etc.).

The language translator module 318 is configured to translate the primary written language content 328 to a secondary language. Examples of secondary languages include English, Chinese, Spanish, or other languages different from the primary language. In this regard, the secondary language may be considered as a foreign language or other non-native language. In one embodiment, the language translator module 318 accesses an Application Programming Interface (API) of a third-party service provider that electronically provides machine translations of uploaded or hyperlinked content. In this manner, the translation may be performed by the third-party service provider and the results of such translations are communicated to the social networking server 112.

The translation of the primary written language content 328 is then stored as the machine-translated content 330. In addition, the labels applied to the instances of the primary written language content 328 are transferred to the instances of the machine-translated content 330. In this manner, the machine-translated content 330 is labeled as well. The number of instances of the labeled machine-translated content 330 may correspond to the number of labeled instances in the primary written language content 328.

In addition to the primary written language content 328, the social networking server 112 also obtains, or is provided with, human-written content written in the secondary language. In one embodiment, the social networking server 112 employs a content extraction module (not shown) similar to the primary language content extractor 316 but configured to extract content in the secondary language. Where the social networking server 112 maintains multiple instances of the social networking service in different languages, this content extraction module may also obtain the secondary language content from one or more of the databases 116-120, such as the member activity database 116. In alternative embodiments, an operator or administrator of the social networking server 112 uploads or transfers the secondary language content to the social networking server 112. The secondary language content is then stored as the secondary written language content 334.

As with the primary written language content 328, the secondary written language content 334 may be labeled as well. However, as there may not be sufficient resources to label the secondary written language content 334, there may be fewer labeled instances of the secondary written language content 334. In yet another embodiment, the social networking server 112, via one or more of the modules 308, requests or obtains labeled instances of the secondary written language content 334. For example, the social networking server 112 may be configured with one or more predetermined thresholds for corresponding secondary languages (e.g., a 50 instance threshold for Spanish, a 100 instance threshold for Chinese, a 75 instance threshold for Japanese, etc.). The social networking server 112 may obtain or receive the labeled instances of the secondary written language content 334 using techniques similar to those used in obtaining labeled instances of the primary written language content 328 (e.g., crowdsourcing).

The feature generator 320 is configured to generate term frequency-inverse document frequency (tf-idf) features from the machine-translated content 330 and the secondary written language content 334. The tf-idf features are used to build one or more language models for classifying secondary language content.

As known in the art, term frequency-inverse document frequency is a numerical statistic that is intended to reflect how important a word is to a document in a collection or corpus. The tf-idf value increases proportionally to the number of times a word appears in the document, but is offset by the frequency of the word in the corpus, which is needed since some words are generally more common than others. Tf-idf is the product of two statistics, including term frequency (tf) and inverse document frequency (idf). A high weight in tf-idf for a given term is obtained when the term has a high frequency in a given document but a low frequency in a collection of documents. The tf-idf weights assigned to given terms tend to filter out common terms (e.g., "the," "a," "is," and other such common terms).

In one embodiment, the feature generator 320 is implemented as the scikit-learn package, which is an open-source platform for data mining and data analysis. The scikit-learn package is available from the website "http://scikit-learn.org/stable/." The features generated from the machine-translated content 330 are stored as the machine-translated features 332 and are associated with their corresponding labels from the machine-translated content 330. The features generated from the secondary written language content 334 are stored as the secondary written language features 336 and may be labeled or unlabeled, depending on whether the initial secondary written language content 334 was labeled.

Having generated features from the machine-translated content 330 and the secondary written language content 334, the feature generator 320 then selects those features for later use in determining a secondary language model. In one embodiment, the feature generator 320 is further implemented as the sklearn.feature_selection module from the scikit-learn package. In particular, the sklearn.feature_selection module is invoked using the "Lasso" technique for feature selection. As known to one of ordinary skill in the art, Lasso is a linear regression problem with an $l_1$ regularizer. Assuming that the feature matrix (e.g., the tf-idf feature matrix) is A, and corresponding labels are y, Lasso can be formulated as the following optimization problem:

$$\min_{x} \frac{1}{2} \|Ax - y\|_2^2 + \lambda \|x\|_1$$

where $\lambda$ is a parameter that controls the balance between the loss function and the penalty. When x is determined, the non-zero entries in x correspond to the selected feature indices of A. This Lasso technique is applied to the features generated from both the machine-translated content 330 and the secondary written language content 334. The features selected using the Lasso technique may also be stored as part of the machine-translated features 332 and the secondary written language features 336.

The feature re-weighing module 322 is configured to re-determine weights for the machine-translated features 332 and the secondary written language features 336. The concept of instance reweighing is to re-calculate the weights for data in a selected domain to make the marginal distribution of features in a source domain and a target domain as close as possible. In this regard, the machine-translated content 330 may be considered as the source domain T and the secondary written language content 334 as the target domain H. In one embodiment, the feature re-weighing module 322 implements Kernel Mean Matching (KMM) to determine the weights for the source domain. The feature re-weighing module 322 solves the following optimization problem:

$$\min_{\alpha} \left\| \frac{1}{m}\sum_{i=1}^{m} \alpha_i \Phi(x_i) - \frac{1}{m'}\sum_{i=1}^{m'} \Phi(x'_i) \right\|^2$$

where:
$x_i$ is the i-th sample in T;
$x'$ is the i-th sample in H;
m is the number of samples in T;
m' is the number of samples in H;
$\Phi$ is a mapping that maps the raw features into another feature space; and
$\alpha$ is the weight to be determined.

To solve this optimization problem, various optimization techniques can be used, such as interior point methods or any other successive optimization procedure. In one embodiment, the feature re-weighing module 322 is implemented as the "optimize" module from SciPy, which is a Python-based ecosystem of open-source software for mathematics, science, and engineering. SciPy is available from "http://scipy.org."

The adaptive learning model generator 324 is configured to determine an initial language model $w_0$, a perturbation $\Delta w$, and a language model w that is used to determine whether a target domain (e.g., a posted comment) is irrelevant or a "spam" comment. The adaptive learning model generator 324 determines the perturbation $\Delta w$ to compensate for any domain mismatch between the native language domain and the foreign language domain. The presumption is that the difference between the machine-translated content 330 and the secondary written language content 334 mainly lies in the marginal distribution, so the difference between $w_0$ (e.g., the initial language model) and w (e.g., the final language model) should be made as small as reasonably possible.

To determine the initial language model $w_0$, the adaptive learning model generator 324 leverages the set of labeled features from the machine-translated features 332. In one embodiment, the initial language model $w_0$ is a regularized logistic regression model and may be represented as the optimization problem below:

$$\min_{w_0} \sum_{i=1}^{m} \log(1 + \exp(-y_i w_0^T \alpha_i x_i)) + \lambda \|w_0\|^2$$

where:
$\alpha$ is the weight determined by the feature re-weighing module 322;

$\lambda$ controls the balance between the loss function and the penalty;
x is a feature selected from the source domain T;
y is the label applied to a corresponding feature x; and
m is the number of features in the source domain T.

In alternative embodiments, however, the initial language model $w_0$ may be represented as a Naïve Bayes model or a linear Support Vector Machine (SVM) model.

Having determined $w_0$, the adaptive learning model generator 324 then determines the perturbation $\Delta w$. The perturbation $\Delta w$ is determined such that the difference between the prediction of $f(x) = w^T x$ and $f(x) = w^{0T} x$ is small. The perturbation $\Delta w$ may be considered as the following minimization problem:

$$\min_{\Delta w} \sum_{i=1}^{m} \log(1 + \exp(-y''_i w^T x''_i)) + \lambda \|\Delta w\|_2^2,$$

which can be rewritten as $$\min_{\Delta w} \sum_{i=1}^{m} \log(1 + \exp(-y''_i (w_0 + \Delta w)^T x''_i)) + \lambda \|\Delta w\|_2^2$$

where:
$\lambda$ controls the balance between the loss function and the penalty;
x" is a feature selected from the target domain H;
y" is the label applied to a corresponding feature x"; and
m is the number of features in the target domain H.

Using the initial language model $w_0$ and the perturbation $\Delta w$, the adaptive learning model generator 324 determines the language model w according to the following equation:

$$w = w_0 + \Delta w$$

The language model w is then stored as the secondary language model 340. The language model w may also be stored in one or more of the databases 116-120, such as the social graph database 118. In this way, the social networking server 112 may store multiple secondary language models, each associated with a different secondary language, and retrieve such models when it processes comments written in a corresponding language.

The secondary language classifier module 326 is configured to classify one or more comments associated with a given target (e.g., an article, a user-submitted post, a status update, etc.) using the determined secondary language model 340. The classifications applied to the one or more comments include whether the comment is irrelevant or a "spam" comment. Examples of such comments include advertisements, nonsensical comments, self-promoting comments, and other such comments. Furthermore, a comment may be an irrelevant or spam comment when the comment is not relevant to its associated target.

In one embodiment, the secondary language classifier module 326 is applied to comments written in the secondary language associated with the secondary language model 340. When a given comment is identified as an irrelevant or spam comment, the social networking server 112, via one or more of the modules 308, may prevent the given comment from being viewed by other members of the social networking service. As one example, the given comment may be associated with a spam identifier and the application server module 312 and/or user interface module 314 may be configured to prevent the display of the given comment in response to recognizing the spam identifier. As another example, the given comment may be prevented from being viewed by being deleted or removed from one or more of the databases 116-120.

Figure 4A:
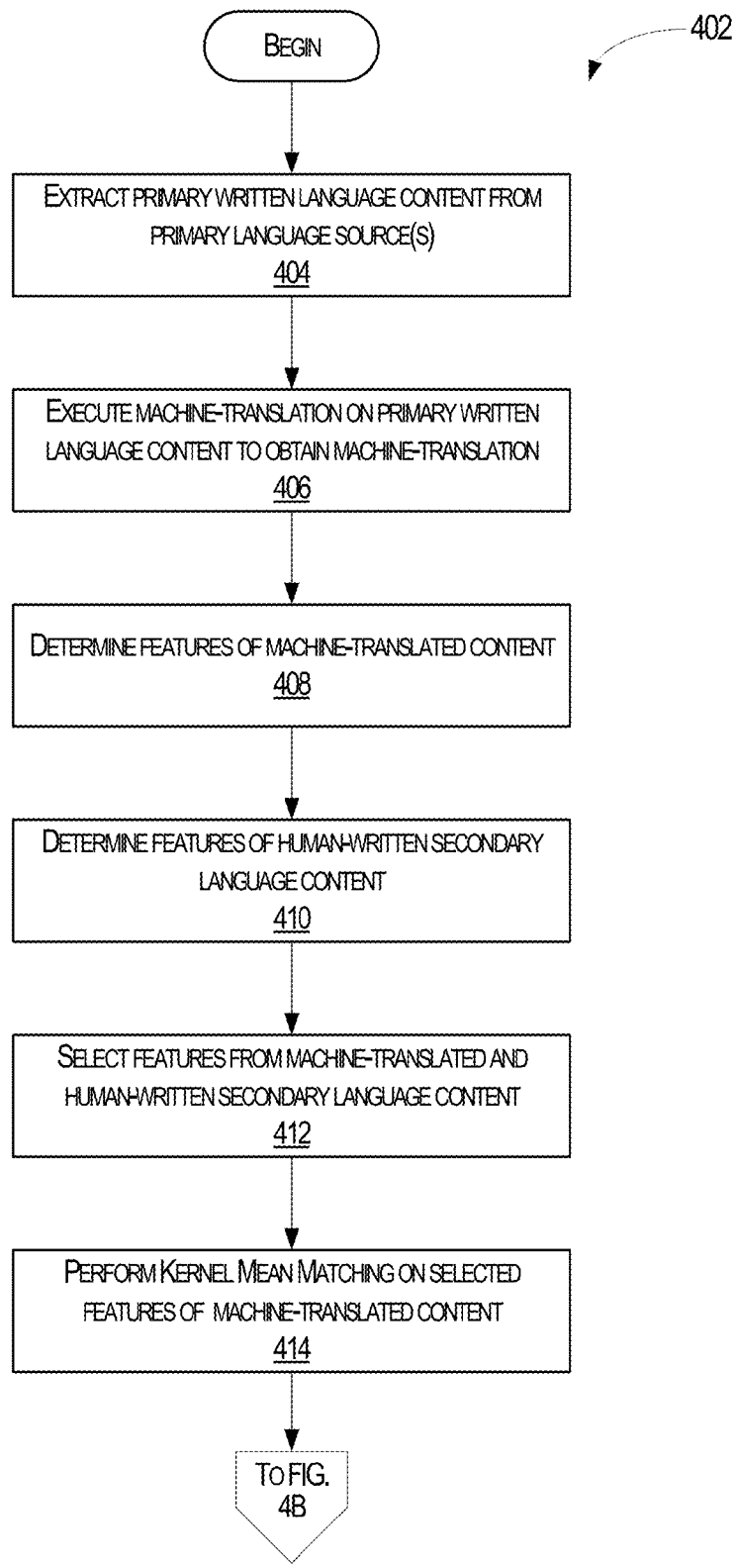
FIGS. 4A-4B illustrate a method, according to an example embodiment, for classifying and identifying comments written in a secondary language.
Figure 4B:
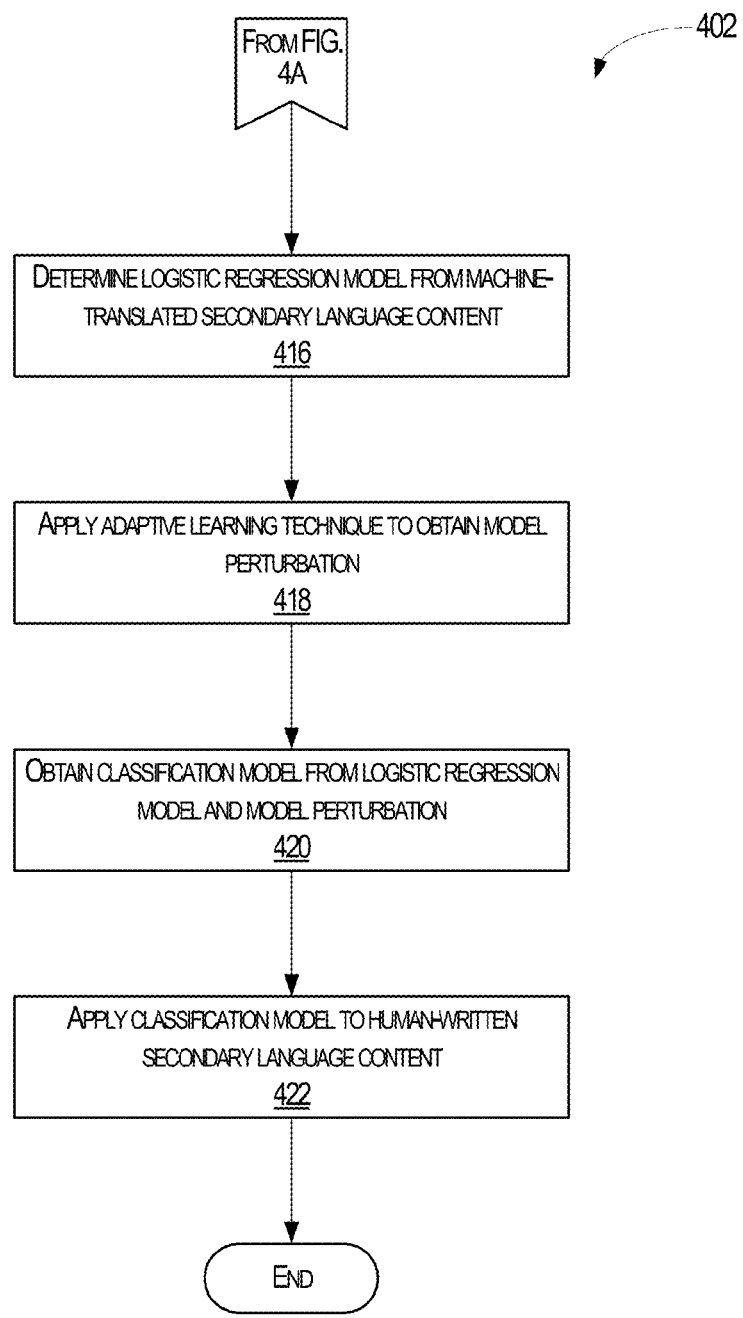

FIGS. 4A-4B illustrate a method 402, according to an example embodiment, for classifying and identifying comments written in a secondary language. The method 402 may be implemented by one or more of the modules 308 of the social networking server 112 and is discussed by way of reference thereto.

Initially, and referring to FIG. 4A, the primary language content extractor 316 extracts primary language content from one or more primary language sources (Operation 404). As explained above, the primary language content extractor 316 may obtain such primary language content from one or more of the databases 116-120. Furthermore, the number of samples that comprise the primary language content may include hundreds or thousands of such samples, and in one embodiment, upwards of 12,000 samples. In addition, the primary language content may be labeled or, in alternative embodiments, the social networking server 112 may request that one or more members of the social networking service label such primary language content.

The social networking server 112 then performs a machine translation on the primary language content (e.g., the primary written language content 328) to obtain the machine-translated content 330 (Operation 406). As explained above, the social networking server 112, via the language translator module 318, may leverage a translation API to obtain the machine translation of the primary written language content 328. Furthermore, and in one embodiment, the labels applied to the primary written language content 328 are associated with, or transferred to, corresponding contents of the machine-translated content 330.

Thereafter, the social networking server 112 determines the features of the machine-translated content 330 (Operation 408) and the features of the secondary written language content 334 (Operation 410). As discussed above, the secondary written language content 334 may be obtained from a variety of sources and, in some instances, from one or more of the databases 116-120. In addition, the secondary written language content 334 may also be labeled. However, there may be fewer samples to label of the secondary written language content 334 than of the primary written language content 328. Alternatively or in addition, the number of samples of the secondary written language content 334 may approximate or be equal to the number of samples of the primary written language content 328, but fewer of the secondary written language content 334 samples may be labeled. In one embodiment, the social networking server 112 determines features for at least 50 samples of the secondary written language content 334.

The social networking server 112 then selects features from the machine-translated content 330 and features from the secondary written language content 334 (Operation 412). As discussed above, the social networking server 112 may select such features using the Lasso method on each sample of the machine-translated content 330 and the secondary written language content 334. The features of the machine-translated content 330 are stored as the machine-translated features 332 and the features of the secondary written language content 334 are stored as the secondary written language features 336.

Thereafter, the social networking server 112 performs instance re-weighing on the machine-translated features 332 (Operation 414). As explained previously, the social networking server 112 may perform KMM on the machine-translated features 332. The social networking server 112 may then store the recalculated weights as the content feature weights 338.

Referring now to FIG. 4B, the social networking server 112 then determines an initial language model $w_0$ corresponding to the language of the secondary written language content 334 (Operation 416). As discussed above, the initial language model $w_0$ is represented as a regularized logistic regression model. The social networking server 112 then determines a perturbation $\Delta w$ (Operation 418) to account for the differences between the features of the machine-translated content 330 and the features of the secondary written language content 334. As explained above, the perturbation $\Delta w$ is represented as a minimization problem, which may involve a convex smooth function that can be solved using one or more gradient methods. Furthermore, the determination of the perturbation $\Delta w$ leverages the labels previously applied to the secondary written language content 334. Finally, the social networking server 112 determines the classification model w by computing the sum of the initial language model $w_0$ and the perturbation $\Delta w$ (Operation 420). As explained above, the classification model w may be stored as the secondary language model 340 and in one or more databases 116-120. In storing the classification model w, the social networking server 112 may also associate the classification model w with the corresponding secondary language.

Using the determined classification model w, the social networking server 112 then classifies one or more human-written comments associated with a given target (Operation 422). As discussed above, the target may be a news article provided by the social networking server 112, an item of interest posted by a member of the social networking service, or any other item of content provided to members of the social networking service. As also previously explained, comments that are classified by the social networking server 112 as being spam or irrelevant to the target are prevented from being displayed to members of the social networking service. In one embodiment, such comments are prevented from being displayed by being deleted or removed from a corresponding database (e.g., one or more of the databases 116-120) or by simply being skipped when comments are being displayed via the user interface module 314.

In this way, the social networking server 112 leverages an adaptive learning technique to reduce the amount of spam or irrelevant comments posted by members of a social networking service. Through experimentation, it has been found that the methodologies and modules disclosed herein are more accurate than other conventional methods. In addition, it was found that the disclosed methodologies and modules work well even under conditions where there may not be enough sample data in the secondary language or labeled sample data in the secondary language for more conventional methods. Accordingly, the technical benefits of these disclosed techniques present advancements in the fields of natural language processing, feature recognition, and adaptive learning techniques.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-4B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 5:
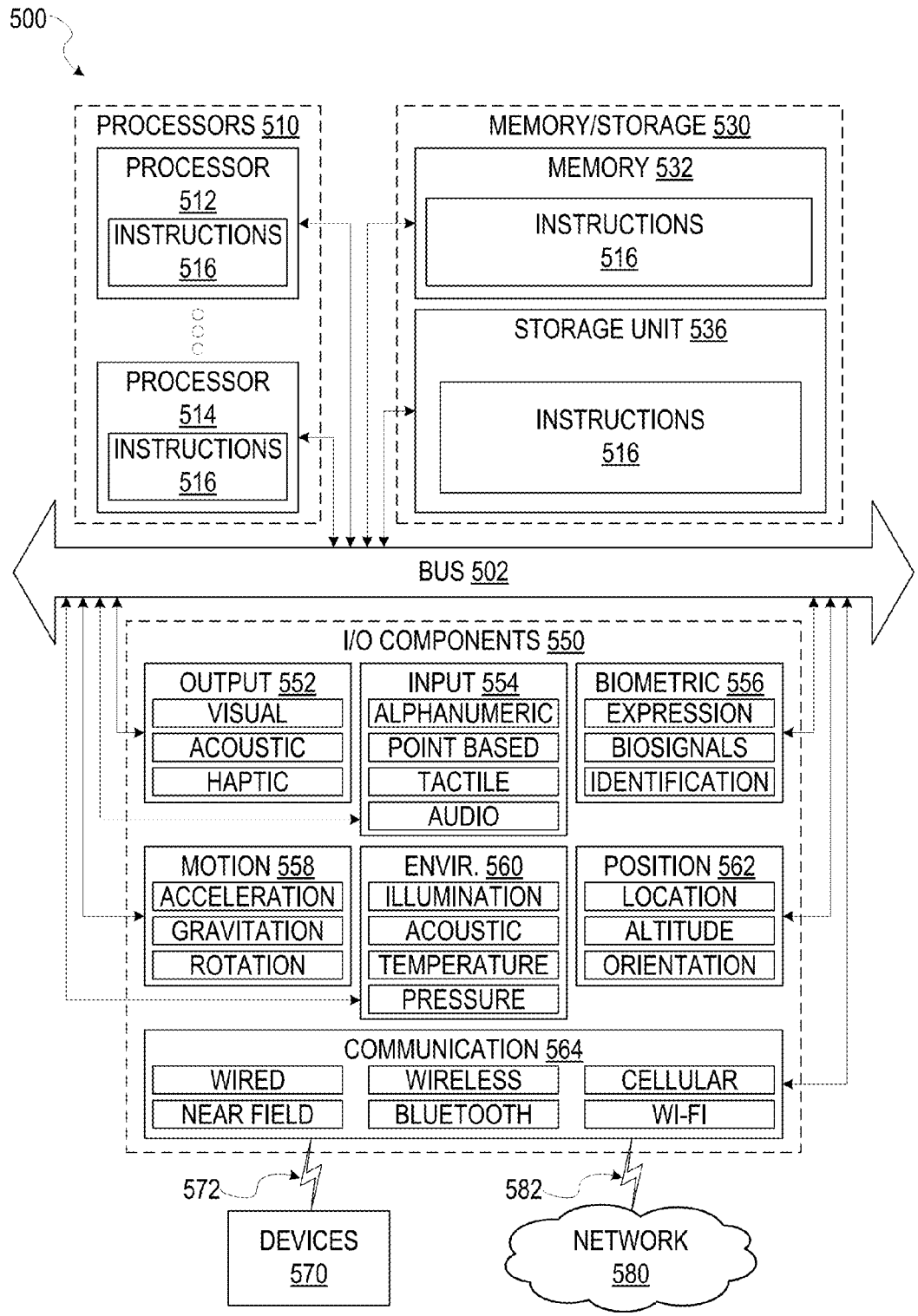
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions 516 may cause the machine to execute the flow diagrams of FIGS. 4A-4B. Additionally, or alternatively, the instructions 516 may implement one or more of the components of FIG. 3. The instructions 516 transform the general, non-programmed machine into a particular machine programmed to carry out the described and illustrated functions in the manner described. In alternative embodiments, the machine 500 operates as a stand-alone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a PDA, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include a multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572 respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF412, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a machine-readable memory storing computer-executable instructions; and
at least one hardware processor in communication with the machine-readable memory that, when the computer-executable instructions are executed, is configured to:
obtain primary language content written in a first spoken language;
obtain secondary language content written in a second spoken language;
obtain a machine translation of the primary language content by machine translating the primary language content from the first spoken language to the second spoken language;
determine an initial language model, based on the second spoken language, from the machine translation of the primary language content;
determine a language model perturbation using the initial language model, the language model perturbation accounting for a difference between the machine translation of the primary language content and the secondary language content;
determine a classification model from the initial language model and the language model perturbation, the classification model being used to classify a given plurality of words written in the second spoken language to identify whether the given plurality of words written in the second spoken language are irrelevant to an item of interest provided by a social media networking site in the first spoken language;
apply the classification model to a plurality of comments received in a written form of the second spoken language and associated with the item of interest;
determine, by using the classification model, that at least one comment selected from the plurality of comments is irrelevant to the item of interest; and
prevent display of the at least one comment in response to classifying the at least one comment as irrelevant,
wherein:
the selected at least one comment was provided by a first member of the social networking service, and
the selected at least one comment is prevented from being displayed to other members of the social networking service that request a display of the item of interest.

2. The system of claim 1, wherein the at least one hardware processor is further configured to:
determine a first plurality of features from the machine translation of the primary language content; and
determine a second plurality of features from the secondary language content; and
wherein the determined initial language model is determined from the first plurality of features and the second plurality of features.

3. The system of claim 2, wherein at least some of the features of the first plurality of features are different from at least some of the features of the second plurality of features.

4. The system of claim 2, wherein the at least one hardware processor is further configured to determine a plurality of weights for a selected set of the first plurality of features, the plurality of weights being determined according to Kernel Mean Matching (KMM) using a distribution of the second plurality of features.

5. The system of claim 2, wherein the language model perturbation is further determined using at least one feature selected from the second plurality of features.

6. The system of claim 1, wherein the initial language model comprises a regularized logistic regression model.

7. The system of claim 1, wherein the selected at least one comment is prevented from being displayed by having been deleted from a database configured to store the selected at least one comment.

8. A method comprising:
obtaining, by at least one hardware processor, primary language content written in a first spoken language;
obtaining, by the at least one hardware processor, secondary language content written in a second spoken language; obtaining, by the at least one hardware processor, a machine translation of the primary language content by machine translating the primary language content from the first spoken language to the second spoken language;
determining, by the at least one hardware processor, an initial language model, based on the second spoken language, from the machine translation of the primary language content;
determining, by the at least one hardware processor, a language model perturbation using the initial language model, the language model perturbation accounting for a difference between the machine translation of the primary language content and the secondary language content;
determining, by the at least one hardware processor, a classification model from the initial language model and the language model perturbation, the classification model being used to classify a given plurality of words written in the second spoken language to identify whether the given plurality of words written in the second spoken language are irrelevant to an item of interest provided by a social media networking site in the first spoken language;
applying, by the at least one hardware processor, the classification model to a plurality of comments received in a written form of the second spoken language and associated with the item of interest;
determining, by using the classification model, at least one comment selected from the plurality of comments as irrelevant to the item of interest; and
preventing, by the at least one hardware processor, display of the at least one comment in response to classifying the at least one comment as irrelevant,
wherein:
the selected at least one comment was provided by a first member of the social networking service, and
the selected at least one comment is prevented from being displayed to other members of the social networking service that request a display of the item of interest.

9. The method of claim 8, further comprising:
determining a first plurality of features from the machine translation of the primary language content; and
determining a second plurality of features from the secondary language content; and
wherein determining the initial language model comprises determining the initial language model from the first plurality of features and the second plurality of features.

10. The method of claim 9, wherein at least some of the features of the first plurality of features are different from at least some of the features of the second plurality of features.

11. The method of claim 9, further comprising:
   determining a plurality of weights for a selected set of the first plurality of features, the plurality of weights being determined according to Kernel Mean Matching (KMM) using a distribution of the second plurality of features.

12. The method of claim 9, wherein the language model perturbation is further determined using at least one feature selected from the second plurality of features.

13. The method of claim 8, wherein the initial language model comprises a regularized logistic regression model.

14. The method of claim 8, wherein the selected at least one comment is prevented from being displayed by having been deleted from a database configured to store the selected at least one comment.

15. A non-transitory, machine-readable medium storing computer-executable instructions that, when executed by at least one hardware processor, cause the at least one hardware processor to perform a plurality of operations, the plurality of operations comprising:
   obtaining primary language content written in a first spoken language;
   obtaining secondary language content written in a second spoken language;
   obtaining a machine translation of the primary language content by machine translating the primary language content from the first spoken language to the second spoken language;
   determining an initial language model, based on the second spoken language, from the machine translation of the primary language content;
   determining a language model perturbation using the initial language model, the language model perturbation accounting for a difference between the machine translation of the primary language content and the secondary language content;
   determining a classification model from the initial language model and the language model perturbation, the classification model being used to classify a given plurality of words written in the second spoken language to identify whether the given plurality of words written in the second spoken language are irrelevant to an item of interest provided by a social medial networking site in the first spoken language;
   applying the classification model to a plurality of comments received in a written form of the second spoken language and associated with the item of interest;
   determining, by using the classification model, at least one comment selected from the plurality of comments as irrelevant to the item of interest; and
   preventing display of the at least one comment in response to classifying the at least one comment as irrelevant,
   wherein:
   the selected at least one comment was provided by a first member of the social networking service, and
   the selected at least one comment is prevented from being displayed to other members of the social networking service that request a display of the item of interest.

16. The non-transitory, machine-readable medium of claim 15, wherein the plurality of operations further comprise:
   determining a first plurality of features from the machine translation of the primary language content; and
   determining a second plurality of features from the secondary language content; and
   wherein determining the initial language model comprises determining the initial language model from the first plurality of features and the second plurality of features.

17. The non-transitory, machine-readable medium of claim 16, wherein at least some of the features of the first plurality of features are different from at least some of the features of the second plurality of features.

18. The non-transitory, machine-readable medium of claim 16, wherein the plurality of operations further comprise:
   determining a plurality of weights for a selected set of the first plurality of features, the plurality of weights being determined according to Kernel Mean Matching (KMM) using a distribution of the second plurality of features.

19. The non-transitory, machine-readable medium of claim 16, wherein the language model perturbation is further determined using at least one feature selected from the second plurality of features.

20. The non-transitory, machine-readable medium of claim 15, wherein the selected at least one comment is prevented from being displayed by having been deleted from a database configured to store the selected at least one comment.

* * * * *

UNITED STATES PATENT AND TRADEMARK OFFICE
CERTIFICATE OF CORRECTION

PATENT NO.        : 10,042,845 B2
APPLICATION NO.   : 14/928331
DATED             : August 7, 2018
INVENTOR(S)       : Amin et al.

Page 1 of 1

It is certified that error appears in the above-identified patent and that said Letters Patent is hereby corrected as shown below:

In the Claims

In Column 25, Line 46, in Claim 15, delete "medial" and insert --media-- therefor Signed and Sealed this
Twenty-eighth Day of May, 2019

Andrei Iancu
*Director of the United States Patent and Trademark Office*